(12) United States Patent
Ingram

(10) Patent No.: US 7,980,020 B2
(45) Date of Patent: Jul. 19, 2011

(54) ARTIFICIAL FISH LURE

(76) Inventor: Charles Marion Ingram, Santa Fe, TN (US)

( * ) Notice: Subject to any disclaimer, the term of this patent is extended or adjusted under 35 U.S.C. 154(b) by 408 days.

(21) Appl. No.: 12/204,616

(22) Filed: Sep. 4, 2008

(65) Prior Publication Data

US 2009/0064564 A1    Mar. 12, 2009

Related U.S. Application Data

(60) Provisional application No. 60/970,284, filed on Sep. 6, 2007.

(51) Int. Cl.
*A01K 85/00* (2006.01)

(52) U.S. Cl. ...................... 43/42.44; 43/42.39

(58) Field of Classification Search .......... 43/42.44, 43/42.39, 43.4, 42.36, 42.08, 42.49, 44.9, 43/42.4
See application file for complete search history.

(56) References Cited

U.S. PATENT DOCUMENTS

| | | | | |
|---|---|---|---|---|
| 1,472,638 A | * | 10/1923 | Dickman | 43/42.36 |
| 1,490,161 A | * | 4/1924 | Dickman | 43/42.36 |
| 1,598,786 A | * | 9/1926 | Romadke | 43/42.26 |
| 1,744,366 A | * | 1/1930 | Davenport | 43/42.44 |
| 2,060,972 A | * | 11/1936 | Bonem et al. | 48/189.3 |
| 1,807,283 A | | 5/1937 | Dick | |
| 2,462,828 A | | 2/1949 | Parnell, Sr | |
| 2,621,439 A | | 12/1952 | Leidel | |
| 2,940,206 A | * | 6/1960 | Agnew | 43/42.35 |
| 3,344,550 A | * | 10/1967 | Peters | 43/42.11 |
| 3,483,651 A | * | 12/1969 | Borger | 43/42.36 |
| 3,680,247 A | * | 8/1972 | McKenzie | 43/42.17 |
| 4,060,926 A | * | 12/1977 | Cordell, Jr. | 43/42.44 |
| 4,477,994 A | * | 10/1984 | Erickson | 43/42.44 |
| 4,553,348 A | * | 11/1985 | Cooper | 43/42.06 |
| 4,920,688 A | | 5/1990 | Devereaux et al. | |
| 5,261,182 A | | 11/1993 | Link | |
| 5,829,183 A | * | 11/1998 | Guerin | 43/42.35 |
| 5,894,693 A | | 4/1999 | Davie | |
| 6,560,915 B2 | * | 5/2003 | Downey | 43/42.39 |
| 6,718,684 B2 | | 4/2004 | Yong-Set | |
| 7,114,285 B1 | | 10/2006 | Ince | |

(Continued)

OTHER PUBLICATIONS

BASSMASTER magazine published Dec. 2010 by BASS, LLC, 1170 Celebration Blvd., Suite 200, Celebration, FL 34474; (Web Site: www.bassmaster.com) under the article Editors' Picks: Top 45 for 2011 stated on p. 42. States: Level of ordinary skill in the art for obvious was lacking in 2008: For years designers have tried to make crankbaits weedless, nearly always replacing the dangling trebles with a large, single overhead hook. At Backstabber Lures, Keith Ray and his pros have created four models, including three divers and a lipless model, that are not only.

(Continued)

*Primary Examiner* — Christopher P Ellis
(74) *Attorney, Agent, or Firm* — James Addison Barry, Jr.

(57) ABSTRACT

An artificial fish lure 100 including a lure body 110, an attaching means 130 to attach the lure body 110 with a fishing line, at least one hook 140 disposed on the upper portion of the lure body, a weight 150 disposed with the lower portion of the lure body, a connecting means 160 to connect the hook 140 with the artificial fish lure 100, and a swivel 170 disposed with the upper portion of lure body such that the at least one hook 140 may be attached with the connecting means 160 whereby the hook 140 may freely rotate 360 degrees.

17 Claims, 6 Drawing Sheets

U.S. PATENT DOCUMENTS

2002/0124455 A1* 9/2002 Bauman ......................... 43/42.44

OTHER PUBLICATIONS

Marsh & Bayou Magazine published Feb. 2011 by Marsh & Bayou, P.O. Box 0023, Slidell, LA 70459, 985-960-0824 on p. 38 under the article "Top Five Gotta See Exhibitors @ Bassmaster Classic Expo" by Capt. JP Morel makes statement illustrating level of ordinary skill in the art for obvious was lacking in 2008: At first glance this appears to be the normal crank bait with the standard treble hook configuration. Upon closer scrutiny you sit up and go, "Hmmm." "How in the heck does that work!" is your next thought. The hook is on top of the bait and it has some.

B.A.S.S.Times published Feb. 2011 by BASS, LLC, 1170 Celebration Blvd., Suite 200, Celebration, FL 34474, phone 877-BASS-USA illustrates the level of ordinary skill in the art for obviousness in 2008 as it states on p. 31: Backstabber Lures Large Lipless—"Backstabber's unique hook placement reportedly increases hookup-to-landing ration while decreasing the frequency with which the bait gets snagged. Plus, both trebles rotate 360 degrees to keep bass from throwing the hook when they jump."

Bassin published winter 2011 by Bassin' Magazine 12818 S. Memorial Dr. Ste 100. Bixby, OL 74008. Customer Service: 800-554-1999. Under the article "50 Best New Lures for 2011" by Darl Black on p. 12 illustrates the level of ordinary skill in the art for obviousness in 2008 as it discusses the No. 1 best new lures for 2011: Stabber Deep Crankbait—Hook placement on top of the lure (attached with a 360-degree swivel) reportedly allows this bait to come through cover with fewer hang ups than a traditional belly hook. The swivel hook also keeps fish from using the lure a.

http://jacksonville.com/sports/outdoors/2010-06-12/story/outdoors-trophy-shelf-and-good-stuff This website illustrates the level of ordinary skill in the art for obviousness in 2008 as it states in 2010 that: "Backstabber: Alabama's Keith Ray came up with a true innovation. His Backstabber lures feature hooks that rotate 360 degrees at the point of connection, making it more difficult for fish to throw the lure. Second, he mounts the forward treble on top, rather than on the bottom, of the lure."

http://www.fieldandstream.com/photos/gallery/fishing/bass-fishing/2010/07/most-unique-innovative-and-weird-new-tackle-icast-2010?photo=7#node-1001364479 photo #8 of 42 This website illustrates the level of ordinary skill in the art for obviousness in 2008 as it states in 2010: Backstabber Lures: So why move the belly hook on a crankbait to the back? According to the fellas at Backstabber Lures, it keeps fish glued a little tighter because they get hooked in the top of the mouth. Both hooks also swivel 360 degrees to stop the lure from shaking loose if you accidently give the.

http://tljfishing.com/?p=180 Backstabber Crankbaits Posted on Jan. 26, 2011 by Tim Jarvis. This website illustrates the level of ordinary skill in the art for obviousness in 2008 as it states in 2011: "One of my favorite new lures for this year is the Backstabber crankbait line from Backstabber Lures. The Backstabber lure features two hooks that rotate 360 degrees that make it almost impossible for the fish to throw this lure. There is no bottom hook to hang up, it has been moved to the top of the lure for better hooking power."

http://www.fishingforcharities.net/index.php?view=entry &category=josh&id=16%3Abackstabber-luresproduct-review &option=com_lyftenbloggie&Itemid=173 Backstabber Lures Product Review Posted in Josh on Dec. 9, 2010 by Josh Goan. This website illustrates the level of ordinary skill in the art for obviousness in 2008 as it states in 2010: The long awaited weedless crank bait has arrived. Voted No. one lure in 2011 by Bass Master Magazine, Kieth Ray and his pro staff designed a weedless crankbait that still has the traditional set of two treble hooks but with.

http://www.worldfishingnetwork.com/users/skippermark/blog/photos-from-the-2011-bassmaster-classic-expo-an-update-on-backstabber-lures-70292.aspx Photos from the 2011 Bassmaster Classic Expo, an Update on Backstabber Lures Posted on Feb. 26, 2011. This website illustrates the level of ordinary skill in the art for obviousness in 2008 as it states in 2011: "The expo introduced many new products and boats to anglers. Here are some of the photos for the event." Keith tells me that he hasn't had a chance to slow down, as soon as he got home from the Classic, he.

http://www.myoutdoortv.com/gear-guide/fishing/lures?page=1 This website illustrates the level of ordinary skill in the art for obviousness in 2008 stating in 2010: "Backstabber Lures: The Backstabber lure features two hooks that rotate 360° that make it almost impossible for the fish to throw this lure! There is no bottom hook to hang-up, it has been moved to the top of the lure for better hooking power."

http://blog.wired2fish.com/blog/?&&&Tag=crankbait&BBPage=2 This website illustrates the level of ordinary skill in the art for obviousness in 2008 stating in 2010: We had some time on Friday to walk around the Forrest Wood Cup Outdoor Expo and talk with some manufacturers we hadn't visited out at ICAST or that weren't there. One of those companies that we saw but just didn't have time to make it to their booth at ICAST was Backstabber Lures. They feature a line of crankbaits that have hooks on their backs instead of on their bellies. The interesting part of the baits.

http://ultimatelunker.com/forums/ubbthreads.php?ubb=showflat &Number=11070 This website illustrates the level of ordinary skill in the art for obviousness in 2008 stating: "I was watching Charlie Ingram's show yesterday, and he had the owner of Backstabber Lures. I have to say this is an interesting concept. Tell me why these won't work."

* cited by examiner

ARTIFICIAL FISH LURE

CROSS-REFERENCE

This application claims the benefit of U.S. Provisional Application Ser. No. 60/970,284, filed Sep. 6, 2007, titled Artificial Fish Lure. The present application is related by the same inventor for all applications; Charles Marion Ingram. The U.S. Provisional Application Ser. No. 60/970,284, filed Sep. 6, 2007, titled Artificial Fish Lure is hereby incorporated in its entirety by reference.

FIELD OF INVENTION

The present invention relates to a device for fishing more particular to an artificial fishing lure.

BACKGROUND OF INVENTION

When a fish is hooked, a fierce battle begins between the angler and the fish, particularly when the fish is hooked on a hard bait, such as a crank bait or a top water lure. The fish is likely to jump, shake, and spin in an effort to dislodge the lure. Sometimes the fish will also use the actual lure itself to pry or rotate the hook out of its mouth. Most hard bait lures have the hooks attached with split rings which may be separated or torn apart allowing the fish to dislodge the hooks easily. Up to 40% of the fish hooked are not landed. There is a need for an artificial hard bait fishing lure that will retain the fish on the hook until landed.

SUMMARY

The use of a swivel allows the hook to rotate during the jumping, shaking, and spinning of a hooked fish without the fish being able to spin and dislodge the hook out of his mouth; or even spinning the attachment or split ring of the hook such that it separates or tears apart. With the use of a swivel system for attaching the hook or hooks to hard bait, the angler may land many more of the fish that are hooked without the fish being able to spin and dislodge the hook.

Placing the hook on the top or upper portion of the lure body enhances the probability of hooking the fish in its upper lip, wherein the upper lip is more secure than the lower lip of the fish. With this configuration, the angler will be able to land more of the fish that he hooks.

In one embodiment a fishing lure comprises a lure body having a front, middle and rear portion and an upper and lower portion; an attaching means to attach the lure body with a fishing line; at least one hook disposed on the upper portion of the lure body; a weight disposed with the lower portion of the lure body such that the upper portion of the lure body is maintained above the lower portion of the lure body; a swivel disposed with the upper portion of lure body such that the at least one hook may be attached with the fishing lure and the hook may freely rotate 360 degrees wherein a fish may not use the hook and the lure body connection for leverage in releasing the fish from the lure body; and a connecting means to connect the swivel with the fish lure.

In one embodiment the fishing lure comprises a lure body having a front, middle and rear portion and an upper and lower portion; an attaching means to attach the lure body with a fishing line; at least one hook disposed on the upper portion of the lure body; a weight disposed with the lower portion of the lure body such that the upper portion of the lure body is maintained above the lower portion of the lure body; a connecting means to connect the at least one hook with the attaching means for the fishing line; and a swivel disposed with the upper portion of lure body such that the at least one hook may be attached with the connecting means and the hook may freely rotate 360 degrees wherein a fish may not use the hook and the lure body connection for leverage in releasing the fish from the lure body.

In another embodiment the fishing lure comprises a lure body having a front, middle and rear portion and an upper and lower portion; an attaching means to attach the lure body with a fishing line; at least one hook disposed on the upper portion of the lure body; a weight disposed with the lower portion of the lure body such that the upper portion of the lure body is maintained above the lower portion of the lure body; a connecting means to connect the at least one hook with the attaching means for the fishing line; and a swivel disposed with the upper portion of lure body wherein the swivel is disposed within the lure body such that the at least one hook may be attached with the connecting means and the hook may freely rotate 360 degrees wherein a fish may not use the hook and the lure body connection for leverage in releasing the fish from the lure body.

In yet another embodiment the fishing lure comprises a lure body having a front, middle and rear portion and an upper and lower portion; an attaching means to attach the lure body with a fishing line; at least one hook disposed on the upper portion of the lure body; a weight disposed with the lower portion of the lure body such that the upper portion of the lure body is maintained above the lower portion of the lure body; a connecting means to connect the at least one hook with the attaching means for the fishing line; and a swivel disposed with the upper portion of lure body wherein the swivel is disposed partially within the lure body such that the at least one hook may be attached with the connecting means and the hook may freely rotate 360 degrees wherein a fish may not use the hook and the lure body connection for leverage in releasing the fish from the lure body.

In still another embodiment the fishing lure comprises a lure body having a front, middle and rear portion and an upper and lower portion; an attaching means to attach the lure body with a fishing line; at least one hook disposed on the upper portion of the lure body; a weight disposed with the lower portion of the lure body such that the upper portion of the lure body is maintained above the lower portion of the lure body; a connecting means to connect the at least one hook with the attaching means for the fishing line; and a swivel disposed with the upper portion of lure body wherein the swivel is disposed on the outside of the lure body such that the at least one hook may be attached with the connecting means and the hook may freely rotate 360 degrees wherein a fish may not use the hook and the lure body connection for leverage in releasing the fish from the lure body.

In one embodiment the fishing lure comprises a lure body having a front, middle and rear portion and an upper and lower portion; an attaching means to attach the lure body with a fishing line; at least one hook disposed on the upper portion of the lure body; a weight disposed with the lower portion of the lure body such that the upper portion of the lure body is maintained above the lower portion of the lure body; a connecting means to connect the at least one hook with the attaching means for the fishing line; and a swivel disposed with the upper portion of lure body wherein the swivel is a barrel swivel or a ball bearing swivel such that the at least one hook may be attached with the connecting means and the hook may freely rotate 360 degrees wherein a fish may not use the hook and the lure body connection for leverage in releasing the fish from the lure body.

In yet another embodiment the fishing lure comprises a lure body having a front, middle and rear portion and an upper and lower portion; an attaching means to attach the lure body with a fishing line; at least one hook disposed on the upper portion of the lure body wherein the at least one hook is a treble hook set having three hooks; a weight disposed with the lower portion of the lure body such that the upper portion of the lure body is maintained above the lower portion of the lure body; a connecting means to connect the at least one hook with the attaching means for the fishing line; and a swivel disposed with the upper portion of lure body such that the at least one hook may be attached with the connecting means and the hook may freely rotate 360 degrees wherein a fish may not use the hook and the lure body connection for leverage in releasing the fish from the lure body.

In still another embodiment the fishing lure comprises a lure body having a front, middle and rear portion and an upper and lower portion; an attaching means to attach the lure body with a fishing line; at least one hook disposed on the upper portion of the lure body wherein the at least one hook is a treble hook set having three hooks and further comprising a second treble hook disposed with the rear portion of the lure body wherein the second treble hook is attached with the connecting means; a weight disposed with the lower portion of the lure body such that the upper portion of the lure body is maintained above the lower portion of the lure body; a connecting means to connect the at least one hook with the attaching means for the fishing line; and a swivel disposed with the upper portion of lure body such that the at least one hook may be attached with the connecting means and the hook may freely rotate 360 degrees wherein a fish may not use the hook and the lure body connection for leverage in releasing the fish from the lure body.

In still another embodiment the fishing lure comprises a lure body having a front, middle and rear portion and an upper and lower portion; an attaching means to attach the lure body with a fishing line; at least one hook disposed on the upper portion of the lure body wherein the at least one hook is a treble hook set having three hooks and further comprising a second treble hook disposed with the rear portion of the lure body wherein the second treble hook is attached with the connecting means; a weight disposed with the lower portion of the lure body such that the upper portion of the lure body is maintained above the lower portion of the lure body; a connecting means to connect the at least one hook with the attaching means for the fishing line; a swivel disposed with the upper portion of lure body such that the at least one hook may be attached with the connecting means and further comprising a second swivel such that the second swivel attaches the second treble hook with the connecting means and the hook may freely rotate 360 degrees wherein a fish may not use the hook and the lure body connection for leverage in releasing the fish from the lure body; and further comprising a diving means to dive the lure body in water when the lure body is moving through the water.

In one embodiment the fishing lure comprises a lure body having a front, middle and rear portion and an upper and lower portion; an attaching means to attach the lure body with a fishing line; at least one hook disposed on the upper portion of the lure body; a weight disposed with the lower portion of the lure body such that the upper portion of the lure body is maintained above the lower portion of the lure body; a connecting means to connect the at least one hook with the attaching means for the fishing line; a swivel disposed with the upper portion of lure body such that the at least one hook may be attached with the connecting means and the hook may freely rotate 360 degrees wherein a fish may not use the hook and the lure body connection for leverage in releasing the fish from the lure body; and a diving means to dive the lure body in water when the lure body is moving through the water wherein the diving means is a plane on the front portion of the lure body with an angle on the front portion that forces the lure body lower in the water with forward motion of the lure body.

In one embodiment the fishing lure comprises a lure body having a front, middle and rear portion and an upper and lower portion wherein the lure body comprises two halves joined together and the lure body is wood or plastic material; an attaching means to attach the lure body with a fishing line; at least one hook disposed on the upper portion of the lure body; a weight disposed with the lower portion of the lure body such that the upper portion of the lure body above the lower portion of the lure body; a connecting means to connect the at least one hook with the attaching means for the fishing line; and a swivel disposed with the upper portion of lure body such that the at least one hook may be attached with the connecting means and the hook may freely rotate 360 degrees wherein a fish may not use the hook and the lure body connection for leverage in releasing the fish from the lure body.

In one embodiment the fishing lure comprises a lure body having a front, middle and rear portion and an upper and lower portion; an attaching means to attach the lure body with a fishing line wherein the attaching means is an eye on the front portion of the lure body whereby the eye may be securely fastened to the fishing line; at least one hook disposed on the upper portion of the lure body; a weight disposed with the lower portion of the lure body such that the upper portion of the lure body is maintained above the lower portion of the lure body; a connecting means to connect the at least one hook with the attaching means for the fishing line; and a swivel disposed with the upper portion of lure body such that the at least one hook may be attached with the connecting means and the hook may freely rotate 360 degrees wherein a fish may not use the hook and the lure body connection for leverage in releasing the fish from the lure body.

In one embodiment the fishing lure comprises a lure body having a front, middle and rear portion and an upper and lower portion; an attaching means to attach the lure body with a fishing line; at least one hook disposed on the upper portion of the lure body wherein the at least one hook disposed on the upper portion of the lure body is connected with the lure body such that the at least one hook may move freely in relation to the lure body; a weight disposed with the lower portion of the lure body such that the upper portion of the lure body is maintained above the lower portion of the lure body; a connecting means to connect the at least one hook with the attaching means for the fishing line; and a swivel disposed with the upper portion of lure body such that the at least one hook may be attached with the connecting means and the hook may freely rotate 360 degrees wherein a fish may not use the hook and the lure body connection for leverage in releasing the fish from the lure body.

In still another embodiment the fishing lure comprises a lure body having a front, middle and rear portion and an upper and lower portion wherein the lure body comprises two halves joined together and the lure body is wood or plastic material; a diving means to dive the lure body in water when the lure body is moving through the water wherein the diving means is a plane on the front portion of the lure body with an angle on the front portion that forces the lure body lower in the water with forward motion of the lure body; an attaching means to attach the lure body with a fishing line wherein the attaching means is an eye on the front portion of the lure body whereby the eye may be securely fastened to the fishing line;

at least one hook disposed on the upper portion of the lure body wherein the at least one hook is a treble hook set having three hooks wherein the at least one hook disposed on the upper portion of the lure body is connected with the lure body such that the at least one hook may move freely in relation to the lure body; a weight disposed with the lower portion of the lure body such that the upper portion of the lure body is maintained above the lower portion of the lure body; a swivel disposed with the upper portion of lure body wherein the swivel is disposed within the lure body wherein the swivel is a ball bearing swivel such that the at least one hook may be attached with the swivel and the hook may freely rotate 360 degrees wherein a fish may not use the hook and the lure body connection for leverage in releasing the fish from the lure body; a connecting means to connect the swivel with the fish lure wherein the connecting means is a molly anchor attached with the swivel and attached with the lure body; and further comprising a second treble hook disposed with the rear portion of the lure body wherein the second treble hook is attached with the connecting means.

BRIEF DESCRIPTION OF THE DRAWINGS

The features, aspects, and advantages of the invention will become better understood with regard to the following description, appended claims, and accompanying drawings where:

DETAILED DESCRIPTION OF THE INVENTION

Figure 1:
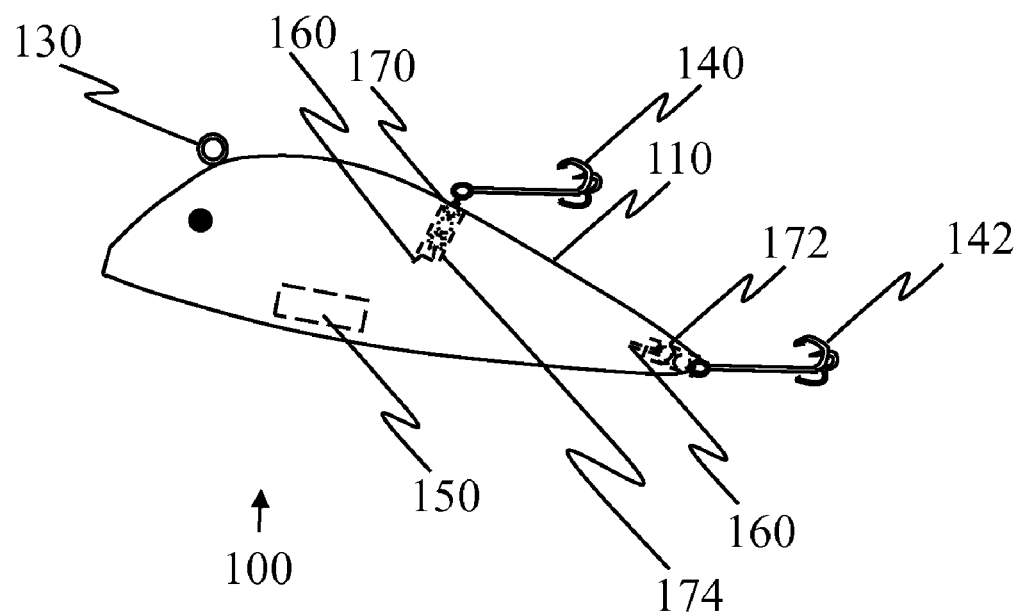
FIG. 1 is a side view of one embodiment of the artificial fish lure.
Figure 2:
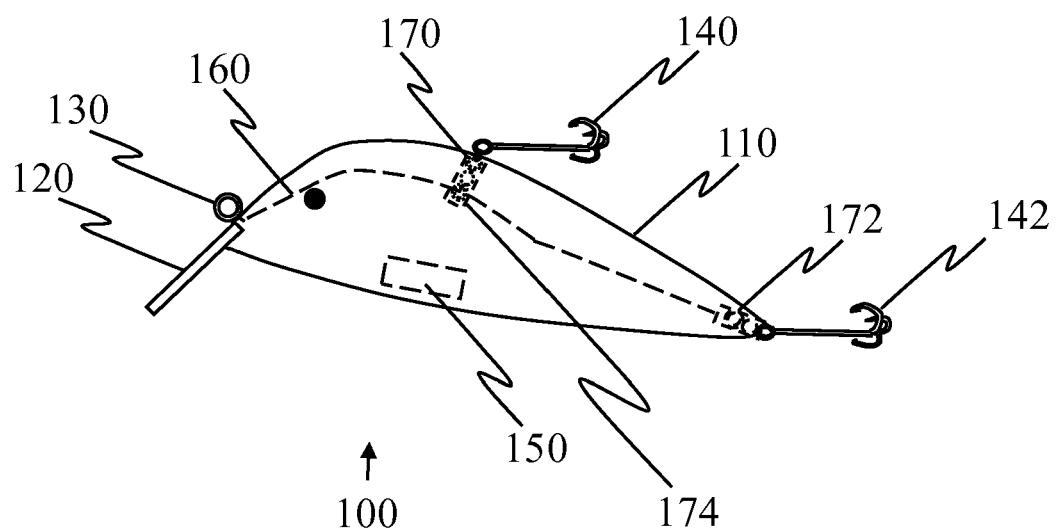
FIG. 2 is a side view of another embodiment of the artificial fish lure.
Figure 3:
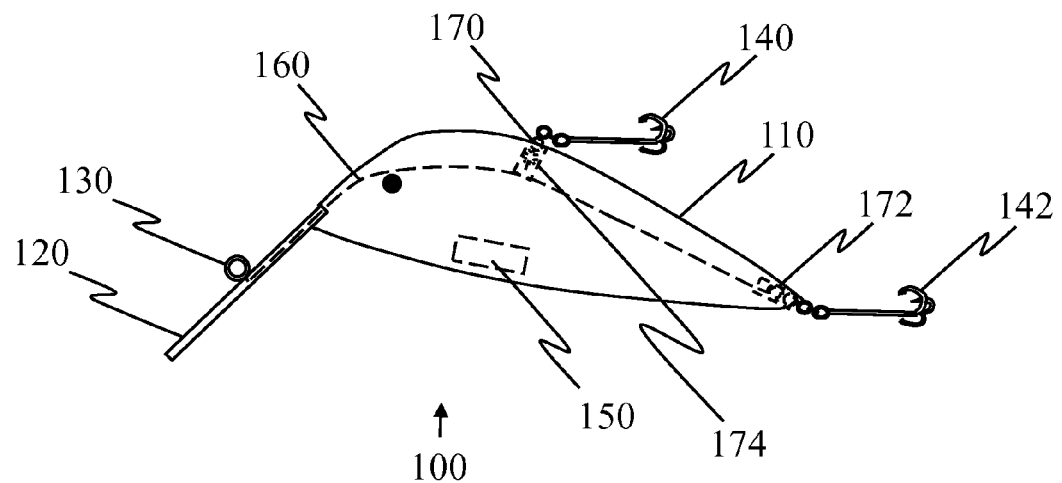
FIG. 3 is a side view of yet another embodiment of an artificial fish lure.

The present invention relates to the field of hard bait artificial fishing lures. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

Overview:

FIGS. 1 through 5 illustrate some embodiments of an artificial fish lure 100 comprising a lure body 110, an attaching means 130 to attach the lure body 110 with a fishing line, at least one hook 140 disposed on the upper portion of the lure body, a weight 150 disposed with the lower portion of the lure body, a connecting means 160 to connect the at least one hook 140 with the artificial fish lure 100, and a swivel 170 disposed with the upper portion of lure body such that the at least one hook 140 may be attached with the connecting means 160 whereby the at least one hook 140 may freely rotate 360 degrees. The use of the swivel 170 allows the at least one hook 140 to rotate during a fish's jumping, shaking, and spinning without the fish being able to spin and dislodge the hook 140 out of his mouth; or even spinning such that the attachment or split ring of the hook 140 separate or tear apart. With the use of the swivel system 170 for attaching the hook or hooks 140 to hard baits and positioning a hook set 140 on the upper portion of the lure body, the angler may land many more of the fish hooked without the fish being able to spin and dislodge the hook 140.

Design Specifications:

The Lure with an Upper Portion Hook or Hook Set:

As depicted in FIGS. 1 through 5, the artificial fish lure 100 includes a lure body 110 having a front, middle and rear portion and an upper and lower portion; an attaching means 130 disposed with the artificial fish lure 100 to attach the artificial fish lure 100 with a fishing line; at least one hook 140 disposed on the upper portion of the lure body; a weight 150 disposed with the lower portion of the lure body such that the upper portion of the lure body is maintained above the lower portion of the lure body; and a connecting means 160 to connect the at least one hook 140 with the artificial fish lure 100. The lure body 110 may include but is not limited to a hard bait body constructed with two halves that may be assembled or glued together. The lure body 110 may be made from wood, or molded with plastic or composites, or similar materials used in the manufacture of lures. The attaching means 130 is a way to attach the artificial fish lure 100 with a fishing line. The attachment means 130 may include but is not limited to the many means in the industry that may be used to attach the artificial fish lure 100 with the fishing line. A preferred means is an eye 130 disposed with either the front portion of the lure body 110, or a diving plane 120, when included, wherein the fishing line is tied to the eye 130 with the front portion of the lure body 110. The at least one hook 140 disposed with the upper portion of the lure body may be such that the at least one hook 140 is not rigid or stiff in a vertical position but it is moveable in relation to the lure body 110 and can move up and down and side to side freely while still connected with the lure body 110. Traditionally the hook or hook set 140 has been located on the lower portion of the lure body 110 because it is easier to balance. When placing the hook or hook set 140 disposed with the upper portion of the lure body, it is advantageous that the upper hook or hook set 140 be moveable as to being able to move up and down as well as to swivel around with some degree of freedom. This freedom of movement prevents impeding the action of the artificial fish lure 100. By placing the hook 140 on the upper portion of the lure body most likely the fish will be hooked in the upper area of the fish's mouth where the mouth is stronger and tougher such that the stronger mouth area will not allow the hook 140 to be torn lose as easily. When the fish is hooked in the lower lip that is attached by the jaw, there is movement that is separate from the muscles of the fish. When attaching the hook to the upper portion of the lure and hooking the fish in the upper area of the fishes mouth, there is no jaw, or hinged area, to separate the upper jaw from the muscle and the strengths of the fish, therefore it is advantageous for the lure to have swiveled hooks to maintain the hooks in the upper area of the mouth during the battle spinning, jumping and churning of the fish. One or more hooks together in a hook set 140 may be used. The three hook system 140 together is typically called a treble hook 140 which is the preferred embodiment, but not the only embodiment for this application. Another preferred embodiment would include a second treble hook 142 disposed with the rear portion of the lure body 110. Other hooks 140 may be included and disposed in different locations around the lure body 110. The weight 150 with the lower portion of the lure body is used to maintain stability for the lure body 110 in the water. The weight 150 may be located inside lure body 110 or the halves of the lure body 110 in the bottom portion preferably toward the front of the lure body 110 to balance the lure body 110 and allow it to run true until the artificial fish lure 100 is retrieved. The weight 150 may help eliminate the possible spin associated with the lure body 110. The connecting means 160 to connect the at least one hook 140 with the artificial fish lure 100 may be a wire attached with the attaching means 130 and attached with each hook or hook set 140, 142 used with the lure body 110. The wire 160 may start with the attaching means 130 and connect with the upper portion treble hook set 140 and continue on to connect with the rear portion treble hook set 142. By fastening the wire 160 to the attaching means or eye 130 and also attaching the wire 160 with each of the hooks or hook sets 140, 142 that are used with the lure body 110, the connecting means 160 is used as a safety line to minimize the possibility of the fish breaking the hook 140 off from the lure body 110 and escaping capture. In another embodiment, the connecting means 160 may include but is not limited to: blind anchor bolts 161 or a foot anchor 162 attached with the lure body 110 and attached with the swivel 170 wherein the connection means 160 connects the swivel 170 with the lure body 110. One embodiment of the artificial fish lure 100 may include a diving means 120 disposed with the lure body 110 to dive the lure body 110 in water when the lure body 110 is moving through the water. The diving means 120 may include but is not limited to a plane attached with the front portion of the lure body that will force the artificial fish lure 100 lower in the water as the lure body 110 moves forward in the water. The angle of the plane in relation to the water flow direction and size of the plane may be changed to produce more or less downward force on the lure body 110 for the desired depth in the water for a certain speed of the lure body 110 through the water based on the buoyancy of the lure body 110 and the amount of weight used with the artificial fish lure 100. The diving means 120 or the diving plane 120 may be attached with the front portion of the artificial fish lure 100 or it may be molded as part of the lure body 110 in manufacture. Either the diving plane 120 or another surface may include a means to vibrate and make noise to attract the fish as another feature.

Figure 4:
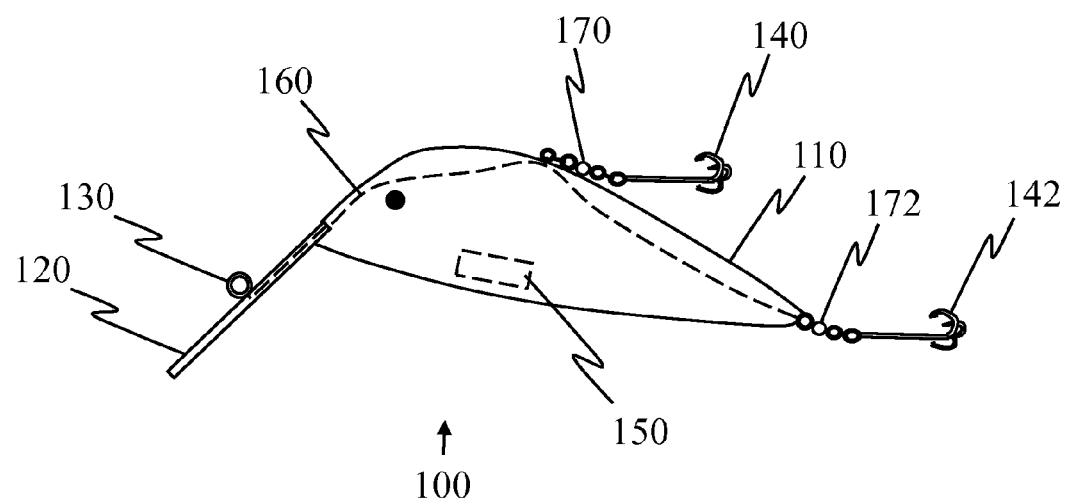
FIG. 4 is a side view of still another embodiment of an artificial fish lure.
Figure 5:
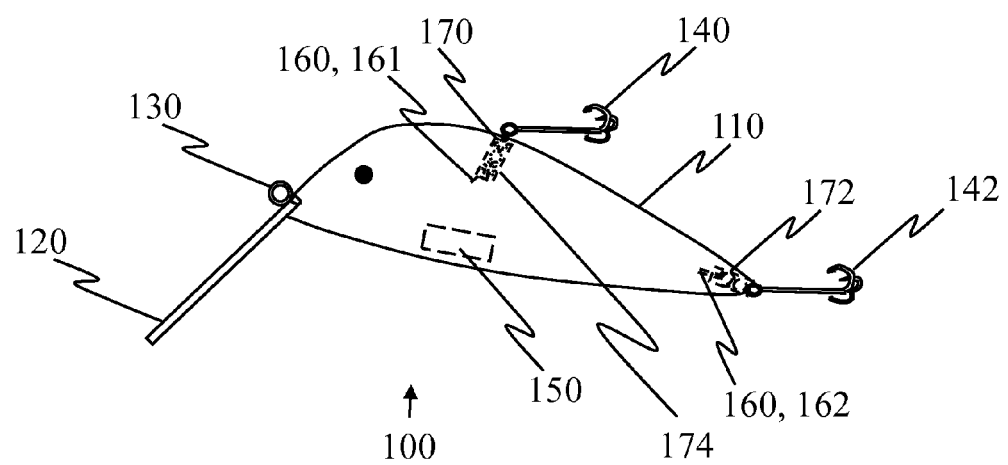
FIG. 5 is a side view of another embodiment of the artificial fish lure.

The Swivel between the Hook or Hook Set and the Connecting Means:

As depicted in FIGS. 1 through 5, the swivel 170 is attached with the hook or hook set 140 and attached with the connecting means 160, and the swivel 170 is attached between the hook or hook set 140 and the connecting means 160. The swivel 170 may be disposed with the upper portion of lure body such that the at least one hook 140 may be attached with the swivel 170 whereby the hook 140 may freely rotate 360 degrees and a fish may not use the hook 140 and the lure body 110 connection for leverage in releasing the fish from the lure body 110. The swivel 170 may be disposed within the lure body 110, see FIGS. 1, 2, and 5; the swivel 170 may be disposed partially within the lure body 110, see FIG. 3; or the swivel 170 may be disposed on the outside of the lure body 110, see FIG. 4. The swivel 170 may have only the attachment post or the eye of the swivel extending from the lure body 110 wherein the attachment post of the swivel is attached with the hook or hook set 140. An o-ring type of connector may be used to attach the swivel eye or attachment post with the hook or hook set 140. The swivel 170 may include but is not limited to a ball bearing swivel, a barrel swivel, or similar types of swivels. The ball bearing swivel 170 is the preferred swivel as it is typically more durable and rotates more reliable than barrel swivels. The swivel 170 combined with the lure body 110 allows for the capability of the hook or hook set 140 to rotate 360 degrees without movement of the lure body 110 thus reducing the ability of the fish to use the binding of the hook 140 and hook attachment with the lure body 110 to break the connection and escape capture. Where the swivel 170 is disposed within the lure body 110 or partially disposed within the lure body 110, a cavity 174 may be provided in the lure body 110 for the swivel 170 and allow movement of the swivel 170 as operationally and functionally needed. With the swivel 170 imbedded in lure body 110, the eye of the swivel or o-ring may extend from lure body 110. With embodiments where the connection means 160 is a wire, the wire may be brought through one end of the swivel 170 or connected with one end of the swivel 170. With embodiments where the connection means 160 is a blind anchor 161 or an anchor foot 162, the blind anchor 161 or the anchor foot 162 may be used to attach the swivel 170 with the lure body 110 as illustrated in FIG. 4. In certain embodiments, the swivel 170 may be in lure body 110 with just the top extending. This may eliminate the cumbersome configuration where the swivel 170 is completely out of lure body 110 between an attachment post and the hook 140. When an additional hook or hook set of at least one hook 142 is added to the rear portion of the lure body, an additional swivel 172 may be added between the connection means 160 and the at least one hook 142. This additional swivel 172 may be imbedded in the lure body 110, disposed on the outside of the lure body 110, or partially exposed on the outside of the lure body 110. Many fish, especially trout are bad about twisting and spinning when they are caught on a hook 140. The swivel 170 may help to retain these fish under those conditions.

Figure 6:
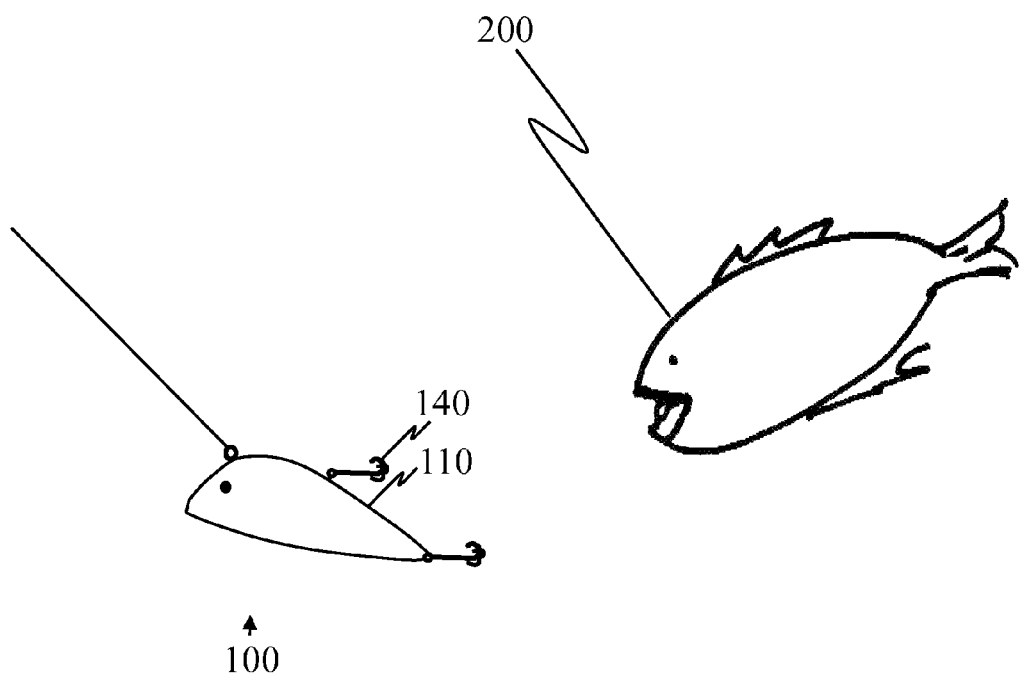
FIG. 6 is a depiction of one use of the artificial fish lure.

Manner of Use:

As illustrated in FIG. 6, the artificial fish lure 100 is cast and retrieved as any other crank bait. The biggest difference is the swiveled hook lands more fish as a result of the hook location on the upper portion of the lure and a swivel. The fish's mouth is attached by a hook 140 with the swivel between the hook 140 and the lure body 110 will make it very difficult for the fish 200 to separate the hook 140 from the lure body 110 increasing the angler's opportunity to land the fish 200 without any additional effort other than using this artificial fish lure 100.

The invention claimed is:

1. A fishing lure comprising:
   a lure body having a front, middle and rear portion and an upper and lower portion;
   a diving means to dive the lure body in water when the lure body is moving through the water;
   an attaching means to attach the lure body with a fishing line;
   at least one hook disposed on the upper portion of the lure body;
   a weight disposed with the lower portion of the lure body to maintain the upper portion of the lure body above the lower portion of the lure body;
   a connecting means to connect the at least one hook with the attaching means of the fishing line; and
   a swivel disposed with the upper portion of the lure body wherein structurally the at least one hook disposed on the upper portion of the lure body is attached with the swivel and the swivel is attached with the connecting means wherein the at least one hook freely rotates 360 degrees and a fish is not able to use the connection of the at least one hook and the lure body for leverage in releasing the fish from the lure body.

2. The fishing lure as set forth in claim 1 wherein the diving means is a plane on the front portion of the lure body with an angle on the front portion that forces the lure body lower in the water with forward motion of the lure body.

3. The fishing lure as set forth in claim 1 wherein the swivel is disposed within the lure body.

4. The fishing lure as set forth in claim 1 wherein the swivel is disposed partially within the lure body.

5. The fishing lure as set forth in claim 1 wherein the swivel is disposed on an outside of the lure body such that the swivel is not within the lure body.

6. The fishing lure as set forth in claim 1 wherein the swivel is a barrel swivel.

7. The fishing lure as set forth in claim 1 wherein the swivel is a ball bearing swivel.

8. The fishing lure as set forth in claim 1 wherein the at least one hook disposed on the upper portion of the lure body is a treble hook wherein the treble hook includes three hooks.

9. The fishing lure as set forth in claim 8 further comprising a second treble hook disposed with the rear portion of the lure body wherein the second treble hook is attached with the connecting means.

10. The fishing lure as set forth in claim 9 wherein a second swivel attaches the second treble hook with the connecting means.

11. The fishing lure as set forth in claim 10 wherein the diving means is a plane on the front portion of the lure body with an angle on the front portion that forces the lure body lower in the water with forward motion of the lure body.

12. The fishing lure as set forth in claim 1 wherein the lure body comprises a plastic material.

13. The fishing lure as set forth in claim 1 wherein the lure body comprises a wood material.

14. The fishing lure as set forth in claim 1 wherein the attaching means is an eye on the front portion of the lure body whereby the eye may be securely fastened to the fishing line.

15. The fishing lure as set forth in claim 1 wherein the at least one hook disposed on the upper portion of the lure body is moveable in relation to the lure body such that an end of the at least one hook that opposes a swivel end of the at least one hook can move up and down and side to side freely while the at least one hook is still connected with the lure body.

16. The fishing lure as set forth in claim 1 wherein the at least one hook disposed on the upper portion of the lure body includes a barb end of the hook that opposes a swivel attachment end of the hook and swivel attachment end of the hook is attached with the swivel such that the barb end of the hook is capable of free rotation movement about a perimeter of approximately an upper half of a spherical area formed above a point wherein the at least one hook is disposed on the upper portion of the lure body in relation to the lure body thus the barb end of the hook is freely moveable up and down and side to side in relation to the lure body while the at least one hook is connected with the lure body thus enhancing the probability of hooking the fish in its more secure upper lip.

17. The fishing lure as set forth in claim 1 wherein the fishing lure comprises a means for the at least one hook disposed on the upper portion of the lure body to rotate 360 degrees about a point wherein the hook and swivel are disposed on the upper portion of the lure body and wherein a "z" axis in relation to the upper portion of the lure body is perpendicular to the lure body surface at the point and the at least one hook disposed on the upper portion of the lure body wherein the means further allows a barb end of the hook to rotate approximately 180 from one side of the lure body through the "z" axis to the other side of the lure body through the point perpendicular to the lure body surface point wherein the barb end of the hook is freely moveable up and down and side to side in relation to the lure body while still connected with the lure body thus enhancing the probability of hooking the fish in its more secure upper lip.

* * * * *